United States Patent Office 2,822,062
Patented Feb. 4, 1958

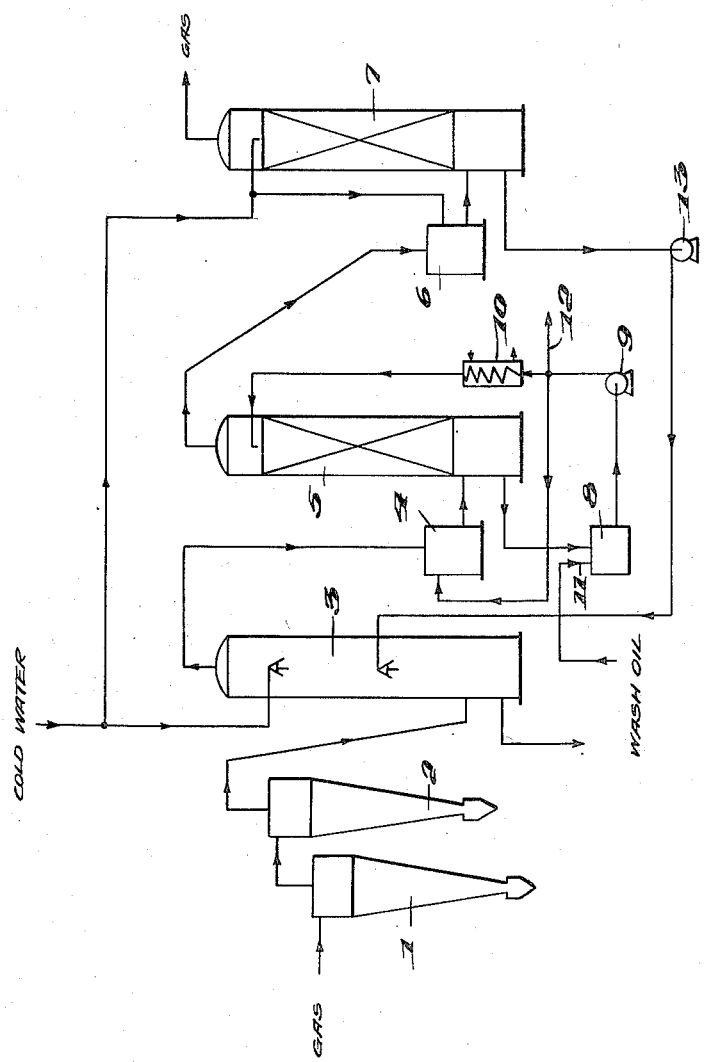

2,822,062
PROCESS OF SEPARATING CARBON BLACK FROM GASES

Karl Haberl, Walter Jahnentz, and Richard Hilgert, Marl, Germany, assignors to Chemische Werke Huls Aktiengesellschaft, Marl, Germany, a corporation of Germany Application July 9, 1956, Serial No. 596,593
Claims priority, application Germany July 27, 1955
1 Claim. (Cl. 183—120)

In the high temperature decomposition of hydrocarbons, for example by means of the electric arc or by partial combustion with oxygen or by thermal or catalytic methods using regenerative, recuperative, moving bed, fluid bed or other processes, acetylene and other products are formed such as ethylene, saturated hydrocarbons, benzene, and considerable amounts of unsaturated easily polymerizable compounds such as higher acetylenes, and also carbon black and hydrocyanic acid. The bulk of the carbon black usually is separated from the gases by means of centrifugal separators and spray washers. The separation of the remainder of the carbon black in the gases usually is done by means of tube or bag filters which must be used at high temperature in order to avoid the condensation of moisture on the filters. As a result the life of the filters is very short. Due to the chemical attack of the gases the filters last several hundred hours only. Moreover the filters tend to become clogged by polymerized high molecular weight unsaturated compounds such as the higher acetylenes.

It has been attempted to avoid the above described difficulties which have been encountered in the use of tube filters by filtering at higher temperatures or by substituting the filters by electrostatic separators. However both of these attempts have failed to give satisfactory results from the technical standpoint because the life of the filters is still further reduced at higher temperatures and the clogging of the filters by polymerization products is not avoided. The electrostatic separators are expensive to install and to operate. Besides they show a strong tendency to become fouled by the condensation and polymerization thereon of the polymerizable constituents of the gases. The insulation of the electrostatic separators also is difficult due to the tendency of the electrically conductive carbon black to form strongly adherent coatings on the insulators.

It has now been found that the above-mentioned difficulties caused by polymerizable or polymerized unsaturated compounds, especially by higher acetylenes and residual carbon black in the gases may be avoided by removing from the hot gases the bulk of the carbon black by means of cyclone separators, cooling the hot gases with sprayed water to a temperature above the dew point of the polymerizable unsaturated compounds in the gases, contacting the resulting cooled gases in at least one scrubber with a wash oil at a temperature above the dew point of water, whereby working at a sufficient high velocity of one of the components to produce a fine dispersion of the wash oil in the gases, passing the mixture of the gases and the wash oil through a packed washing tower, in which said mixture is treated with a wash oil introduced at the top of said packed tower at a temperature above the dew point of water and cooling the resulting gases for the recovery of the wash oil therefrom. The term "scrubber" as used herein refers to apparatus in which a wash oil is finely subdivided by the high speed of the gas or/and liquid, for example Venturi washers, Theissen washers, disintegrators, washers having rotating bells and the like.

At high temperatures the wash oils have a low surface tension and therefore give a very good distribution in the scrubber. In this way it is possible to achieve an extraction efficiency of more than 95% and to purify the gases to a carbon black content of less than 10 mg. per normal cubic meter. It is important that the cracked gas to be purified shall be at a temperature ranging somewhat below that of the wash oil so that water and the higher acetylenes will not be condensed in the scrubber. The nature of the cracked gas and the wash oil determine the temperature to be maintained, said temperature being easily determinable by a preliminary test and being generally within the range from about 30° C. to about 70° C.

The higher acetylenes are soluble in the wash oil while the carbon black forms a highly fluid suspension in the wash oil. The carbon black taken up by the wash oil readily may be separated therefrom by distillation of the wash oil or by filtration or by centrifuging. The wash oil is circulated by means of a pump and a part of the circulating stream is withdrawn continuously or intermittently and purified and returned to the circulation or replaced by a fresh supply of wash oil. The amount of wash oil to be separated from the circulating stream depends upon the amounts of higher acetylenes and carbon black present in the gases. In any case too high a concentration of the polymerizable compounds in the wash oil must be avoided since otherwise polymerides may form and precipitate and give rise to difficulties.

Various wash oils may be used such as aromatic wash oils, which contain basic organic nitrogen compounds and have boiling points above 310° C. and are good solvents for the polymerides. Other suitable wash oils are the aliphatic and cycloaliphatic wash oils which have aniline points above 0° C. e. g. 40–70° C. including aliphatic diesel oil with a boiling range of 220° C.–290° C., hydrocarbons resulting from the hydrogenation of carbon monoxide and having a boiling range of 220–280° C., hard-coal tar oil having a boiling range of 240–330° C., and others.

When the washing operation is carried out at a temperature above 60° C., which temperature is suitable for cracked gases containing large amounts of the higher acetylenes, it is advisable in order to avoid the loss of wash oil, to recover wash oil by cooling and condensation from the cracked gases which are now practically free of carbon.

In order that the invention may be fully understood a specific embodiment of process operation and of apparatus therefor will be now described with reference to the accompanying drawing.

The process is started with a cracked gas produced from a mixture of methane and its lower homologues at a temperature above 1000° C. and which contains acetylene, ethylene, higher acetylenes, higher olefines, diolefines and carbon black as well as a considerable amount of water vapour (up to 60%) as a result of quenching the hot cracked gases with water. This gas is introduced as indicated by the legend and arrow into the apparatus illustrated in the drawing. The bulk of the carbon black content of the gas is first removed by the two cyclone separators 1 and 2 while the gas is at a temperature above the dew point. The gas then passes to the spray washers 3 where the bulky moisture content and some additional carbon black are washed out of the gas by means of cold water sprays. When leaving the spray washers 3 the gas should not have a carbon black content above 0.5 g. per normal cubic meter before it is contacted with wash oil in the following scrubber 4. If the cracked gas is under pressure a Venturi washer can be used as the scrubber. On the other hand if a suction blower is used to move the gas a scrubber can be used which also serves to forward the gas. At low operating temperatures and with viscous wash oils rotary centrifugal absorbers are preferred because this type of scrubber is adapted to operate with highly viscous oils.

The scrubber 4 is operated at a temperature at which the polymerizable unsaturated compounds in the gas remain in the gaseous state. The higher the operating temperature of the scrubber 4 the higher must be the boiling point of the absorption oil selected for use in order to maintain the losses of such oil as low as possible unless means are provided for the recovery of wash oil after condensing it in the washer 7.

Following the scrubber 4, the gas passes to the washing tower 5 where it is contacted with wash oil. In the tower 5 any wash oil carried in the form of spray in the gas leaving the scrubber 4 will be separated from the gas. To this end the tower 5 preferably is a packed tower and may be supplemented by a centrifugal separator (not shown).

Wash oil is supplied to the tower 5 by the pump 9 which circulates the wash oil from the tank 8 through the steam heater 10 to the tower 5 and back to the tank 8. A branch pipe delivers oil, as required from the pump 9 to the scrubber 4. The amount of wash oil circulated through the tower 5 must be sufficient to flow over the filling bodies in this tower, otherwise deposits of carbon black may form in the tower.

Fresh oil is supplied to the tank 8 through the pipe 11 and an identical amount of used oil is withdrawn through the pipe 12 to be regenerated or otherwise disposed of. The quantity of fresh oil to be supplied through pipe 11 depends upon the concentration of carbon black and polymerizable compounds in the gas. The optimum feed of fresh oil readily can be determined by experiment for each wash oil and gas composition used.

The gas leaving the tower 5 and substantially free from carbon black and unsaturated, polymerizing compounds, is delivered to the water washer 7 wherein the cracked gas is further cooled to the temperature required for the successive processing. At the same time the absorption oil vapors contained in the cracked gas are condensed and said vapors do not cause any fouling of the apparatus as it would be the case with the hydrocarbon vapors, which are removed by oil washing from the cracked gases. Also traces of carbon black are removed from the gas. This water washer 7 may be a spray tower or a packed tower. The most suitable construction is a countercurrent washer which gives good utilization of the cooling water. In order to attain an extraordinarily good condensation of the absorption oil vapors, it is advantageous to connect the water washer 7 in series with the scrubber 6, likewise operating with water. The efficiency of the water-operated scrubber 6 is, due to its arrangement after the washing tower 5, and without additional cost for auxiliary devices and energy, so high that it is possible to attain an extraction rate of more than 80% with a carbon black content in the cracked gas of less than 10 mg. per normal cubic meter. Thus it is possible to reduce the carbon black concentration in the cracked gas, leaving the water washer 7, below 1 mg. per normal cubic meter.

A further advantage of the method is the feasibility of providing a countercurrent flow of cooling water to the cracked gas by feeding superposed spray washer 3 with water leaving the water washer 7. Thus further savings in the required quantity of cooling water can be achieved by this two fold utilization of the water. Since at the same time the method permits the achievement of a high temperature of the water leaving the spray washer 3, the quantity of water required for producing a specific outgoing temperature may be reduced to half of the amount required for the same outgoing temperature in any of the existing standard single-step spray washers. The quantity of acetylene which is lost with the water, can be considerably reduced due to the higher temperature of the water leaving the spray washer 3 and to the reduced quantity of water used.

The invention is illustrated by the following specific example.

3600 normal cubic meters per hour of electric-arc cracked gas with a carbon black content of 30 g. per normal cubic meter and a hydrocyanic acid content of 8.5 g. per normal cubic meter were freed from the bulk of the carbon black through two serially connected centrifugal separators 1 and 2 and a water-operated spray washer 3 and cooled to 47° C. Then said gas with a carbon black content of 187 mg. per normal cubic meter was washed with absorption oil at 50° C. in a Venturi washer 4. It was then introduced tangentially at high velocity into the lower part of a packed tower 5 wherein it was also washed with absorption oil of 50° C. The absorption oil was supplied at the rate of 30 tons/h. from the sump of the packed tower 5 through the tank 8, and the steamheated heater 10, to the head of the washing tower 5. Pure absorption oil at the rate of 300 l./h. was introduced through the pipe-line 11. The same quantity of absorption oil was drawn off through the pipeline 12 and regenerated by distillation. The circulating absorption oil was maintained at a temperature of 50° C. The absorption oil showed a carbon black content of 2.3 g./l. as well as a content of 24 g./l. of polymerized and polymerizable unsaturated compounds, and the absorption oil remained free of water.

An aromatic hard coal tar oil having a boiling range of 250°–330° C. was used as absorption oil. The cracked gas, leaving the packed tower 5, showed a carbon black content of 7.4 mg. per normal cubic meter. Thus the extraction rate amounted to 96%. The cracked gas, leaving the packed tower 5 at 48° C. was lead over a water-operated Venturi washer 6, wherein the carbon black content was reduced to 1.6 mg. per normal cubic meter and the temperature was reduced to 35° C. It was then introduced tangentially at high velocity into the lower part of the water washer 7, constructed as a packed tower. The extraction rate was 78% of carbon black. The water washer 7 was operated with 20 normal cubic meter per hour of water, whereby the hydrocyanic acid was fully washed out. The water leaving the water washer 7 was delivered to the spray washer 3 by the pump 13. Then the gas was delivered for further processing with a carbon black content of 1.6 mg. per normal cubic meter, a hydrocyanic acid content of 50 mg. per normal cubic meter, and a temperature of 25° C.

We claim:

Method of separating carbon black from gases produced by the high temperature cracking of hydrocarbons and containing acetylene, polymerizable unsaturated hydrocarbons, especially higher acetylenes, and carbon black which comprises removing the bulk of carbon black by means of cyclone separators, cooling the hot gases with sprayed water to a temperature above the dew point of the polymerizable unsaturated hydrocarbons in the gases, contacting the cooled gases in at least one scrubber with a continuously recycled sprayed wash oil at a temperature above the dew point of water to produce a fine dispersion of the wash oil in the gases, passing the dispersion of the sprayed wash oil in the gases through a packed washing tower in which the said dispersion is treated with a continuously recycled wash oil introduced at the top of said packed washing tower at a temperature above the dew point of water, withdrawing a portion of the wash oil from the scrubber and the packed washing tower and replacing it by the equivalent portion of fresh wash oil, and cooling the resulting gases for recovery of wash oil therefrom.

References Cited in the file of this patent

UNITED STATES PATENTS

| | | |
|---|---|---|
| 1,985,548 | Pyzel | Dec. 25, 1934 |
| 2,668,754 | Lichtenfels | Feb. 9, 1954 |
| 2,741,332 | Finneran et al. | Apr. 10, 1956 |